United States Patent [19]
Robison

[11] 4,252,277
[45] Feb. 24, 1981

[54] FLUID DISTRIBUTOR FOR FIXED BED ION EXCHANGE SYSTEM

[75] Inventor: Herbert D. Robison, 105 Engamore La., Apt. 102, Norwood, Mass. 02062

[73] Assignees: Herbert D. Robison; Gordon B. Nute

[21] Appl. No.: 107,312

[22] Filed: Dec. 26, 1979

Related U.S. Application Data

[62] Division of Ser. No. 896,400, Apr. 14, 1978.

[51] Int. Cl.³ .................................................. B05B 1/16
[52] U.S. Cl. ...................................... 239/556; 239/562
[58] Field of Search ................. 210/289, 291; 239/548, 239/553.3, 557, 562–564, 568, 556

[56] References Cited
U.S. PATENT DOCUMENTS
4,107,044   8/1978   Levendusky ........................ 210/291

Primary Examiner—Ivars C. Cintins

[57] ABSTRACT

A fluid distributor for use in ion exchange vessel assemblies contain ion exchange resins, particularly fixed-bed assemblies. The distributor includes a hub containing a central fluid passage and at least two sets of laterally disposed, fluid-distributing conduits. One of the sets of lateral conduits has holes screened by a fine, resin-retaining mesh. A remotely-controllable valve assembly disposed in the hub regulates flow between the hub and the sets of lateral conduits, so that flow between the screened conduits and the hub may be shut off. The hub also includes means for adjusting the relative rate of fluid flow through the sets of lateral conduits.

5 Claims, 5 Drawing Figures

| STEP | VALVE AA | AB | BA | BB | RA | RB | TA | TB | WA | WB | E G | VA | VB | SOLENOID VALVE |
|---|---|---|---|---|---|---|---|---|---|---|---|---|---|---|
| 1. SERVICE | X | | | | | | | | | | | | | 2 |
| 2. EXPAND BED | | | X | | | | X | X | | X | X | X | | 1 |
| 3. DROP BED | X | | | | | | X | X | | X | | X | | 2 |
| 4. BACKFLUSH | | X | | | | X | | | X | | | | | 1 |
| 5. BACKWASH RDT | | | X | X | | X | | | | | | | X | EITHER STATE |
| 6. BACKWASH EXCHANGE VESSEL | | | X | | | | | | X | X | | | | 2 |
| 7. RAISE & REPLACE BED | | X | X | | | | X | X | X | | | | | EITHER STATE |
| 8. REPLACE BED | | X | | | | X | X | X | X | | | | | 1 |
| 9. COMBINED FLUSH | | | X | X | | X | | | X | | | | | 1 |
| 10. REGENERANT INTRODUCTION | | | | | X | | | | | | X | | | 1 |
| 11. DISPLACEMENT | | | | | X | | | | | | X | | | 1 |
| 12. RINSE | X | | | | X | | | | | | | | | 2 |

FLUID DISTRIBUTOR FOR FIXED BED ION EXCHANGE SYSTEM

This is a division, of application Ser. No. 896,400 filed Apr. 14, 1978.

FIELD OF THE INVENTION

This invention relates to demineralization of liquids and, more particularly, to water treatment by the use of ion exchange resins.

BACKGROUND OF THE INVENTION

Demineralizer systems for removing ionized particles from water for the purpose of purification have been known in the prior art for a considerable period of time. In such systems, untreated water is purified by flowing it through beds consisting of cation and anion exchange resins. Two types of resin beds may be employed, primary beds containing either a cation or an anion exchange resin, but not both, and mixed beds containing both cation and anion exchange resin beads mixed together. Frequently, systems will employ multiple vessels or tanks containing primary resin beds for performing initial demineralization, followed by a final stage of treatment in a vessel containing a mixed resin bed. The treatment capacity of such a train of demineralizer stages is thus principally limited by the estimated exchange capacity of the primary bed tanks, i.e. fluid volume treated per internval between resin regeneration, for a given influent water composition.

Characteristically, exchange capacity is defined on the basis of user needs and then translated into the volume of cation and anion resins required to provide the desired performance. Once the required resin volume has been established, it is then possible to determine the sizes of the vessels required for containing the resin beds. According to conventional practice, ion exchangers consist of a plurality of vessels in which the actual ion exchange process takes place, together with associated control apparatus, piping and valving. Each vessel comprises a vertical or upright tank housing a bed of exchange resin material therein. One or more distributors are provided within the upper region of such a vessel and a collector system is provided in the bottom region thereof. Since the resin expands during backwashing, and as it goes from regenerated to exhausted form, a significant portion of the volume within the vessel is empty of resin during the in-service, ion-exchange procedure, to allow sufficient "rise space" to accommodate such expansion.

According to the conventional system set out above, both the service and regeneration fluid flows are in a downward direction. That is, fluid is introduced into the top of the exchange vessel and flows downward therethrough. The resin in the bed may either expand during regeneration and shrink during exhaustion, or vice versa, depending on the characteristics of the particular resin selected. When multiple distributors are used, the regenerant is introduced through one, with the other being employed for the service and backwash flows.

Another prior art system is characterized by so-called counterflow or "counter-current" operation. According to this principle, the influent liquid to be treated flows downward through the resin bed and regeneration is accomplished by an upward flow, or vice versa. The flow of the influent liquid to be treated through the resin bed, gives rise to ion exchange zones which are displaced accordingly through the exchange material as the resin bed becomes progressively exhausted. In other words, ions which are most easily trapped by the resin are removed from the fluid in the first portions of the bed. Less easily captured ions which are more loosely bound are displaced from the resin by the more easily captured, tightly bound ions and do not find exchange sites until they reach positions in the latter portions of the bed. When a sufficient number of exchange sites on the resin have been exhausted by trapped ions, efficient purification is no longer possible. Liquid will pass through the bed untreated. At this point, it is necessary to terminate processing and to backwash the resin bed to remove suspended matter. Regeneration and rinsing of the resin are then accomplished by bringing suitable chemical solutions into contact with the resin, to chemically strip the trapped materials from the resin beads, and then rinsing out the excess regenerant and the impurities.

Regardless of which of the foregoing operational schemes is employed, it is necessary to allow sufficient volume in the vessel to accommodate chemical swelling of the resin bed. In prior art systems with resin volumes and vessel size seleced for specific site requirements, such chemical swelling is accommodated in various ways. For example, in the conventional downflow service vessel wherein downflow regeneration is practiced, as allowance is made for chemical swelling by providing sufficient volume within the vessel to permit upward backwashing of the resin, within the vessel, prior to regeneration. Since backwashing requires that the packed resin beads be agitated apart to free trapped materials and expose the surfaces of the beads in preparation for regeneration, the volume expansion of the bed associated with backwashing is generally several times that associated with the aforementioned chemical swelling. In some types of counterflow schemes, involving upflow regeneration in a downflow service vessel, an allowance for backwash expansion will also be sufficient to provide for chemical swelling. However, in both of these cases, unless the service vessel has been deliberately oversized, additional resin cannot be loaded into the vessel without eliminating needed rise space. And, indeed, such oversizing would be economically inefficient, in any event.

In a contrasting type of counterflow system, the resin bed is compressed upwardly against a retaining collector either during service or regeneration, and backwashing in the service vessel is not practical per se. Therefore, a certain amount of vessel volume must be provided as rise space to accommodate resin swelling. Should additional rise space be provided to permit expansion during backwash, the resin-retaining upward flow collector would not permit the passage of dirt from the vessel. Therefore, this type of counterflow application requires the periodic removal of all of the resin from the service vessel, to cleanse it of foreign material. With this design, overall vessel height is restricted to only that amount needed to contain the resin volume, to accommodate swelling, and to ensure hydraulic efficiency in either the upflow service or regeneration steps. To load additional resin in the vessel in excess of the amount needed for the specific requirements at the time of installation would, therefore, require that the service vessel be made larger than needed, which would be economically wasteful and detrimental to hydraulic efficiency.

SUMMARY OF THE INVENTION

The present invention provides an apparatus and method for operating primary cation and anion exchange vessels with substantially greater quantities of resin than permitted by prior art designs and methods. This permits a substantial increase in exchange capacity as compared with the prior art, for vessels of like size. As more fully explained below, the present invention permits resin bed depth to be increased until almost the entire vessel is filled with resin, without regard to rise space requirements and without restricting the backwashing operation, thereby making possible a 75–100 percent increase in exchange capacity without the need for additional exchange vessels. In addition to being suitable for installation as a complete system per se, the present invention is also uniquely well adapted to enable prior art installations to be modified according to the teachings herein, to increase their exchange capacity at minimal cost. Consequently, this invention provides a way of increasing exchange capacity of existing demineralizer systems without requiring the installation of entire additional trains of exchange vessels.

To achieve these results, the present invention incorporates a special, remotely-controllable hub lateral assembly comprising a spider distributor which is installed in the top hed of an ion exchange vessel, to permit and control fluid flow into and out of the vessel. The spider distributor is provided with a hub containing a central fluid passage and at least two sets of laterally disposed fluid conduits through which fluid may flow between the vessel interior and the central fluid passage of the hub. Internal flow control means are provided within the hub, responsive to an external control, for apportioning the flow between the sets of lateral conduits, to achieve efficient hydraulic operation.

The central fluid passage of the distributor hub is connected outside the exchange vessel to appropriate piping for supplying and removing both water and regenerating chemicals, and inside the vessel to a chamber in the hub which is in fluid communication with a first set of lateral conduits. The internal flow control means of the distributor hub assembly comprises a diaphragm valve which is used to selectively open or close a passage from that chamber to a second set of lateral conduits. The state of the diaphragm may be hydraulically or pneumatically controlled, in response to pressure applied thereto through a diaphragm control device mounted externally to the vessel. During regenerant introduction and displacement, the diaphragm is automatically closed, so that there is no flow through the second set of lateral conduits; and during service, rinse and backwash operations, the diaphragm is opened, permitting flow through both the first and second sets of lateral conduits.

All of the lateral conduit elements are provided with numerous openings or ports therein to permit fluids to flow between the vessel interior and the inside bore of each of the conduits. The openings of the first set of lateral conduits, however, are screened by a closely spaced wire wrapping or mesh, to prevent resin beads from passing therethrough. Otherwise, during those stages of operation in which water or regenerant flows out of the vessel through the distributor, resin beads might also flow out of the vessel and be lost. The principal consideration in sizing the holes of the lateral conduits is the providing of proper hydraulic conditions. Thus, the holes on the first (i.e., upper) set of lateral conduits are sized according to the hydraulic flow required during regenerant introduction and displacement, and the holes on the second (i.e., lower) set of lateral conduits are then sized according to service flow requirements.

As stated above, according to the present invention, the depth of the resin bed in a primary bed exchange vessel is increased until almost the entire vessel is filled with resin. Sufficient void space is allowed, however, to permit expansion and contraction of the resin during regeneration and in-service exhaustion. Typically, this expansion is on the order of 12 to 22 percent of initial bed volume. In a cylindrical vessel, this implies a corresponding 12 to 22 percent increase in bed depth. To accommodate this expansion, about 15 to 25 percent of the vessel volume must initially be free "void" space unoccupied by resin or equipment, so that the resin expansion can take place. Thus, according to the present invention, the resin bed initially occupies about 80% of the vessel volume.

However, as noted above, the resin bed volume must expand to a greater extent during the backwashing operation to permit the removal and washing out of physically trapped materials from the resin bed. Typically, a 75 to 100 percent expansion is needed for adequate backwashing. Since the resin bed initially occupies about 80 percent of the exchange vessel volume, prior to backwashing a predetermined portion of the resin bed must be removed from the exchange vessel, to allow for such expansion of the remaining portion of the bed. The predetermined quantity of resin is therefore removed from the exchange vessel via a resin transfer nozzle and appropriate piping and valving, and transferred to an accessory tank. This permits the level of the resin bed remaining in the exchange vessel to drop (and then expand during backwashing). For this reason, the accessory tank is referred to as a "resin drop tank", or RDT, for short and the exchange vessel is called a "dropped bed resin tank", or DBRT. The very act of transferring serves to backwash the displaced resin to some extent. However, the transfer flow is continued if necessary to completely backwash the displaced portion of the resin bed. After the resin which remains in the exchange vessel is backwashed and the resin from the RDT is returned to the exchange vessel, the backwashed resin is regenerated and returned to service.

Since regeneration is confined to the exchange vessel, no chemical activity takes place in the RDT. Thus, the RDT may be extremely simple in design and inexpensive in construction, employing easy-to-use materials, such as fiberglass. Moreover, since the RDT is used only during the backwashing and regeneration operations, if several exchange vessels are operated on different, staggered schedules such that no two of them require backwashing and regeneration at the same time, this permits a single RDT to be time-shared (i.e., multiplexed) between these several exchange vessels. Also, there is no need to maintain strict temperature control of the RDT environment; this represents additional cost savings over the prior art. Finally, it should be realized that the RDT may even be located remotely or exterior to the building or area occupied by the existing demineralizing train(s), thus permitting system capacity to be increased easily even where space is limited, without incurring the added expense associated with building alteration or new construction.

By contrast with the benign environment of the RDT, chemical activity does take place within the demineralizer system's anion and cation exchange vessels and they are, therefore, of special construction. Normally, these vessels are lined with rubber or plastic linings to protect the metal walls of the vessels against the corrosive effects of the acidic/caustic conditions which exist therein. Therefore, both in adapting the present invention to existing systems, and in constructing new demineralization systems, it is necessary that the resin transfer nozzle installed on the side of the exchange vessels not destroy the integrity of this lining. A nozzle has been designed which is suitable for installation in both new and existing systems. In adapting the present invention to existing demineralizer trains, it is particularly pertinent that this resin transfer nozzle, described in detail below, permits existing exchange vessels to be modified without violating the applicable ASME code requirements.

BRIEF DESCRIPTION OF THE DRAWINGS

These and other features of the present invention are more fully described below in the detailed description of the preferred embodiment, presented for purposes of illustration and not by way of limitation, and in the accompanying drawing in which.

DETAILED DESCRIPTION OF A PREFERRED EMBODIMENT

In general, the de-ionization of liquids with ion exchange resins is accomplished in the above-described prior art systems by an operational sequence involving three distinct operations. First, the exchange vessel is placed in service until the resin becomes exhausted. Next, the resin is backwashed to remove trapped materials and to loosen the resin beads. This exposes the surface of the resin beads and prepares the resin for the next operation, regeneration. The regeneration operation involves the introduction of an acid solution (in the case of cation resins) or a caustic solution (in the case of anion resins), to chemically strip the ions which have been trapped by the resins. A rinsing operation is also associated with regeneration, to remove the chemical solutions ("regenerants") used to release the captured ions. Generally, a two-stage rinse is employed. A first, slow rinse is used to displace the regenerant and to simultaneously provide a controlled contact time between the regenerant and the resin beads, at the desired solution concentration. Thereafter, water is introduced for a fast rinse to remove any remaining regenerant. The conductivity of the fluid as it leaves the exchange vessel is monitored and rinsing is terminated in response to such monitoring when conductivity reaches a predetermined, desired level. Thereafter, the vessel is returned to service and the operational sequence repeated.

Figure 1:
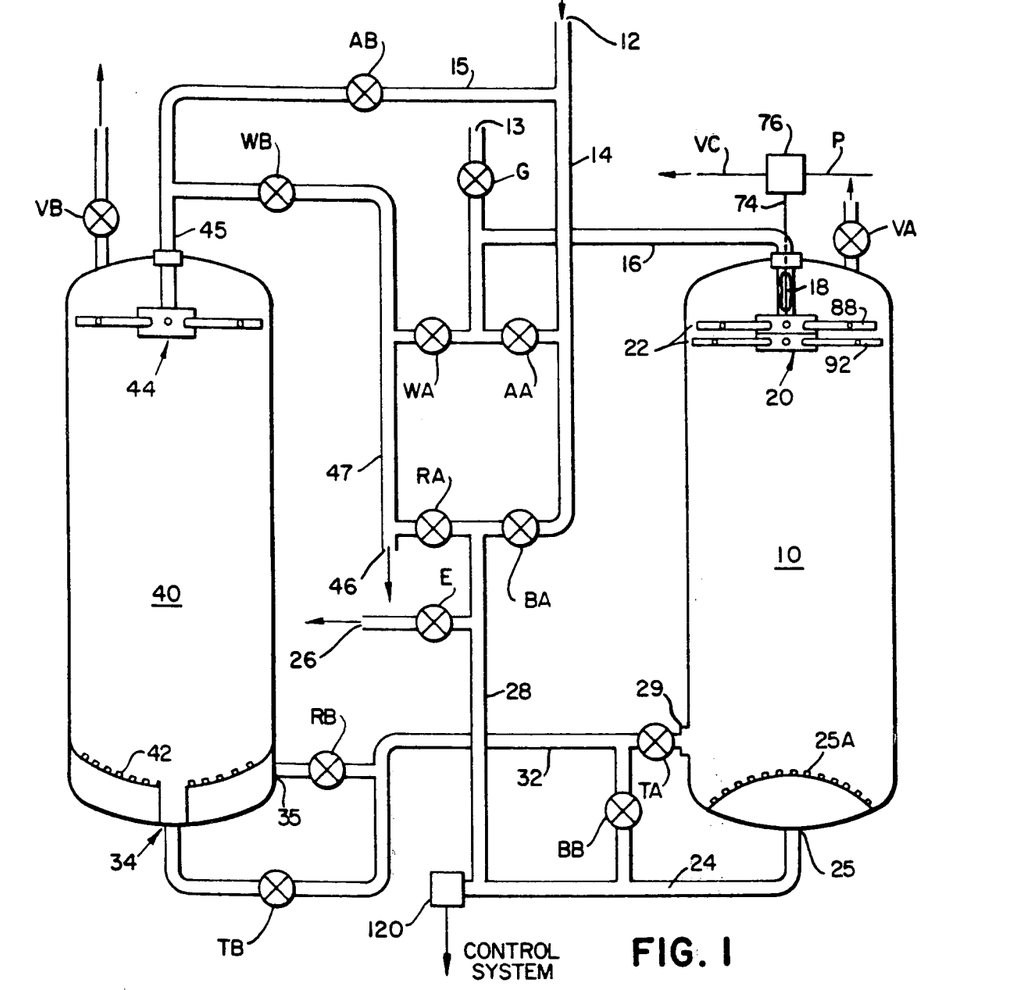
FIG. 1 is a schematic diagram of a primary bed ion exchange vessel associated with a resin drop tank according to the present invention.
Figure 2:
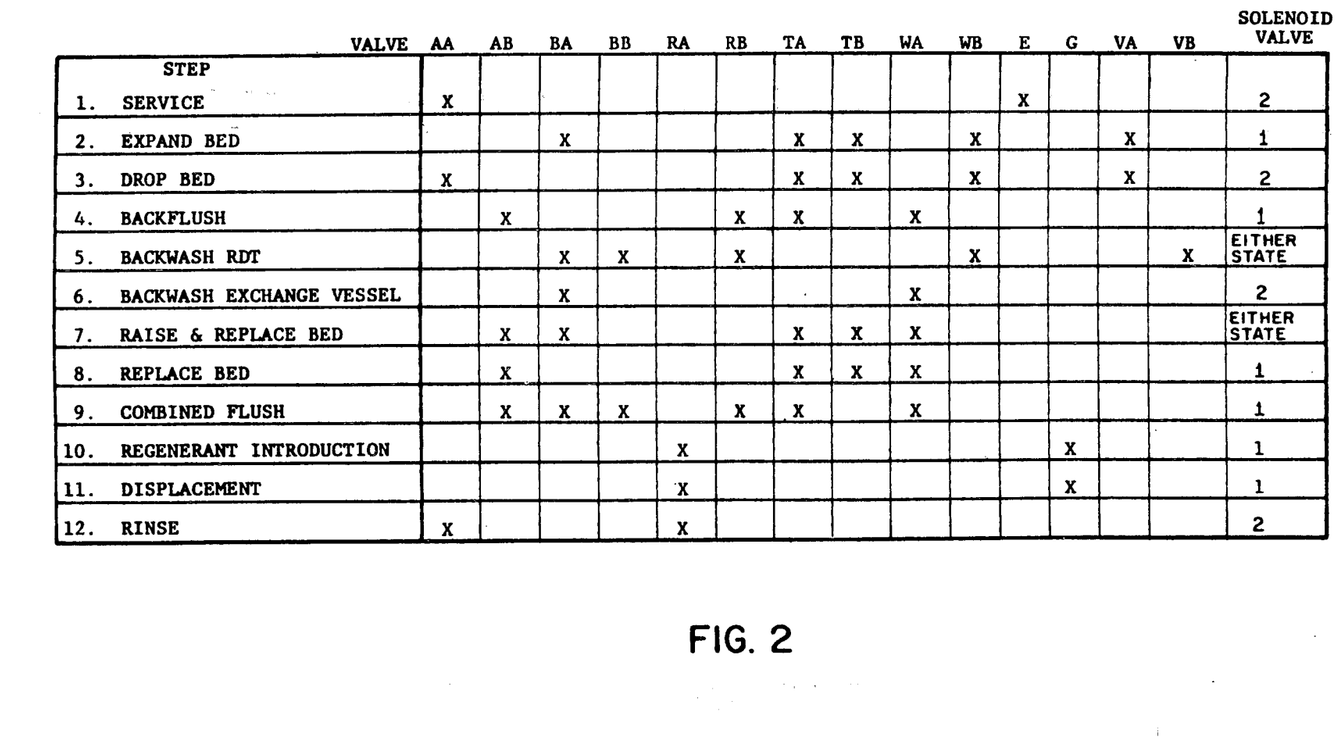
FIG. 2 is a regeneration sequence chart showing valve conditions for the preferred embodiment of the present invention and wherein open valves are indicated by the letter "X"

Referring now to FIG. 1, there is shown there in diagrammatic form an exchange vessel and an associated resin drop tank, with the required valving and piping. The operational sequence for this system is qualitatively the same as that just previously discussed. However, in order to explain the operation of the invention, it is preferable to break down the sequence into 12 principal steps. These steps are characterized by the condition of the control valves and the resulting flows. To summarize the positions of the valves shown in FIG. 1, in association with these various steps, a regeneration sequence chart is provided in FIG. 2. The diagram of FIG. 1 and the chart of FIG. 2 are jointly explained below. A brief digression will first be made, however, to explain the structure and functioning of the spider distribution of the hub lateral assembly shown in FIG. 3, so as to permit reference thereto in the subsequent description of the operation of the system shown in FIG. 1.

Figure 3:
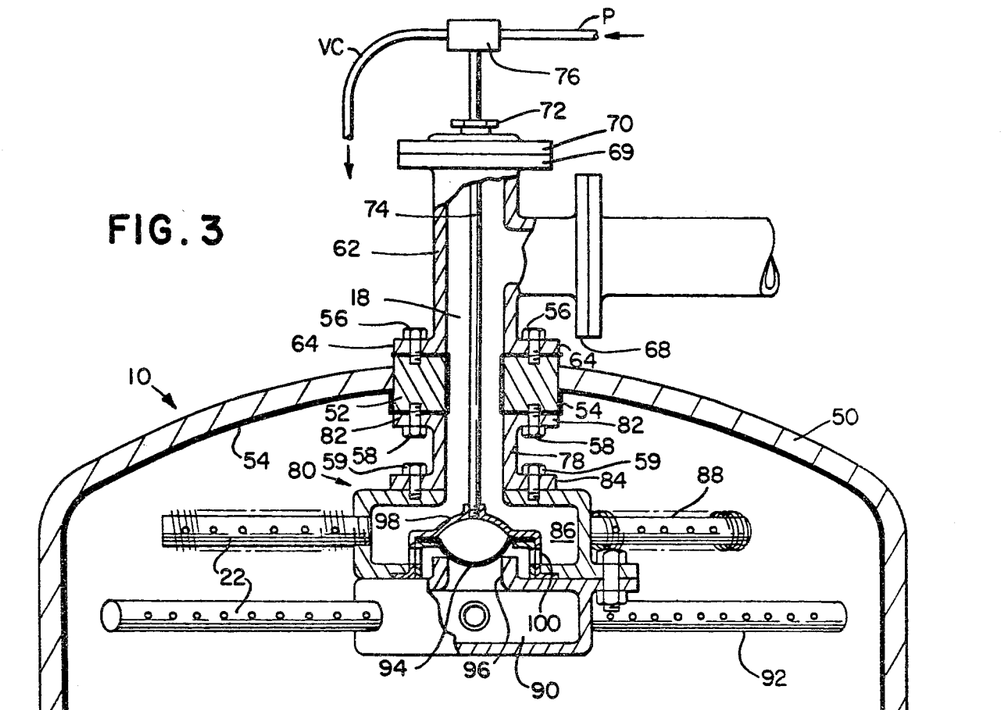
FIG. 3 is a partially sectioned side view of a hub lateral assembly intended according to the present invention.

As illustrated in FIG. 3, spider distributor 20 comprises an assembly which is located partially interior to the exchange vessel and partially exterior thereto. The exchange vessel 10 (see FIG. 1) is generally defined by a wall 50 with an opening in the top thereof. Welded into the top opening of the vessel is a metal collar 52, referred to as a "tank pad". The purpose of the tank pad is simply to serve as a convenient structure upon which to mount the distributor. A rubber coating or lining 54 protects the interior of the vessel wall 50 and extends over the bottom surface of the tank pad, up the central opening therein and out over the top surface of the tank pad. Holes are drilled and tapped into the top and bottom of the tank pad for receiving mounting bolts 56 and 58. The portion of the distributor assembly 20 mounted exterior to the vessel comprises a pipe section 62 having an upper flange 69 and a lower flange 64. The lower flange is fastened to the top of the tank pad 52 by bolts 56. Pipe section 62 opens sideways into a third flange 68. This flange provides an attachment point for the valve nest and piping through which liquid enters and exits at the top of the vessel. Upper flange 69 of pipe section 62 is closed by a reducing flange 70 having a packing bushing 72 threaded therein. Packing bushing 72 provides a fluid-tight seal around a control tube 74 which is of substantially smaller diameter than the inside diameter of pipe section 62. On the outer side of the packing bushing, one end of the control tube is connected to a first port of a three-way solenoid valve 76. A second port of the solenoid valve 76 is open to the atmosphere or a drain, as appropriate, to provide a vent VC. The third port of solenoid valve 76 is connected to a hydraulic or pneumatic pressure supply, not shown, via pressure supply conduit P. On the inner side of the packing bushing, the control tube is disposed within the interior, central passages of pipe section 62, tank pad 52 and pipe section 78, terminating at a second end thereof interior to the hub 80 of the spider distributor.

Hub 80 comprises, in general, an upper chamber 86 associated with a first or upper set of lateral conduits 88 and being in fluid communication with central passage 18 via an opening in the chamber connecting it with pipe section 78, a lower chamber 90 associated with a second or lower set of lateral conduits 92 and a remotely actuable valve assembly for alternately closing off the upper and lower chambers from each other or permitting them to communicate with each other, as desired. The upper set of lateral conduits is wrapped with a wire screen or mesh, as explained elsewhere herein. Hub 80 is fixed to tank pad 52 by pipe section 78. The latter is secured to the tank pad by bolts 58 through an upper flange 82 and to the top of the hub by bolts 59 passing through a lower flange 84 and received in the wall of the hub.

In general, the vessels of the type used for demineralizing fluids by means of ion exchange resins are cylindrical in shape, capped at the upper end by a curved head. To maximize the tank volume available for the resin bed, pipe section 78 is made very short and the upper set of lateral conduits is made shorter than the lower set of lateral conduits. This permits at least the upper set of conduits to be disposed in the head of the exchange vessel, above the straight part of the tank.

The valve structure associated with chambers 86 and 90 more particularly comprises a movable diaphragm 94 for opening or closing the passage between the two chambers. This passage is provided by an upwardly extending and centrally disposed wall portion 96 with an opening, sealable by the diaphragm, at the upper end thereof. Within the upper chamber is disposed a diaphragm stop member 98, resembling an inverted cup. The upper end of diaphragm stop member 98 opens into and receives the lower end of control tube 74. Diaphragm stop member 98 is suspended above the open end of lower chamber wall 96, spaced apart therefrom, by a diaphragm support wall 100. The diaphragm support wall encloses the upwardly extending wall portion 96, contains several ports or openings 101 therein, and has a bottom flange 102 which is secured against the upper, outer wall of the lower chamber. Diaphragm 94 is secured against the under side of the rim of the diaphragm stop member 98, outside the cupshaped portion thereof. When solenoid valve 76 is in the first of its two states, responsive to a control signal provided thereto by a control system, not shown, the first port of the solenoid valve is connected to the third port thereof. Thus, positive pressure is introduced from pressure conduit P via control tube 74, to force diaphragm 94 downward to engage the upper opening of lower chamber wall 96, providing a seal thereagainst and thereby closing off lower chamber 90 from upper chamber 86 and preventing flow therebetween. Of course, this has the additional effect of closing off lower chamber 90 from central passage 18 and, consequently, from the piping connected to flange 68. When the solenoid valve is switched to the second state, the first valve port is connected to the second valve port. Correspondingly, control tube 74 is connected to vent VC. In this state, upward pressure against diaphragm member 94 is not resisted by a downward pressure on the diaphragm. Rather, as a result of the venting connection just described, the presence of upward hydraulic pressure in the lower chamber will cause the diaphragm to move upward, releasing the seal on lower chamber wall 96, until it is in contact with and retained by the diaphragm stop member 98. With the diaphragm in this position, the upper and lower chambers are in fluid communication via the open end of wall 96 and ports 101 in the diaphragm support wall.

A diaphragm suitable for the described functioning comprises a shaped and molded piece of flexible, water impermeable material which is resistant to corrosion. Numerous plastics and other polymers are ideally suited to this application, such as neoprene, viton and HYPALON (a registered trademark of E. I. duPont de Nemours & Co.).

While the lateral conduits may be attached to the hub assembly by any convenient type of construction, in the specific example described herein, the hub walls are shown as being provided with tapped holes for receiving the lateral conduits, and the lateral conduits are shown as having threaded ends adapted to be received by the tapped holes of the hub wall. It should be appreciated that no additional support structure is required for the upper set of lateral conduits, at least, a situation not generally true of prior art distributors.

Figure 4:
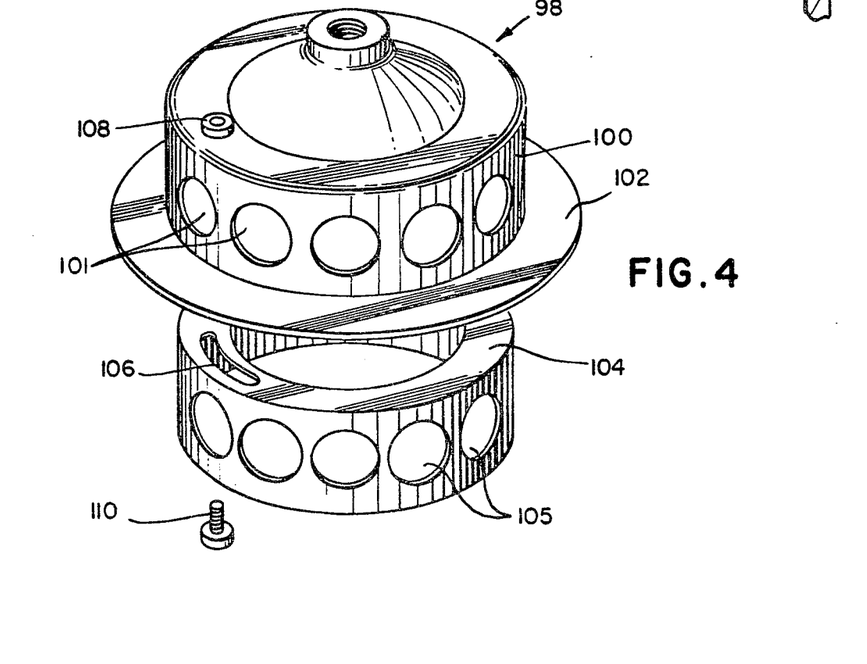
FIG. 4 is an exploded, pictorial view of an optional portion of the hub lateral assembly of FIG. 3.

Further describing the specific example illustrated in the drawings, we observe that the lower chamber and upper chamber of the hub assembly are formed as separate components which are bolted together to form the composite hub. This approach has been followed both to facilitate construction and, at least in part, to permit the accommodation of an optional means for controlling the flow through the ports 101 in the diaphragm support wall 100. This flow control is provided by including a means for varying the effective aperture size of those ports. Referring to FIGS. 3 and 4, it will be seen that this result is accomplished by inserting a ring 104 between the outside of lower chamber wall 96 and the inside of diaphragm support wall 100, closely adjacent to the diaphragm support wall. Ring 104, termed the diaphragm port ring, is provided with holes 105 which match the holes 101 of the diaphragm support wall. By rotating the diaphragm port ring relative to the diaphragm support wall, the region of coincidence between the holes in each of those elements will determine the effective apperture size of the openings presented to the flow of water therethrough. A locking mechanism is provided to permit the diaphragm port ring to be rotated to the desired effective aperture size and then locked in place. This locking mechanism, as illustrated, comprises an arcuate slot 106 in the diaphragm port ring 104 and a matching threaded screw hole 108 in the diaphragm support wall. A screw 110 passes through the slot in the diaphragm port ring and into the threaded hole of the diaphragm support wall, so that when the screw is tightened the two elements are locked together. The inclusion of the aperture control feature provides the capability, during assembly or maintenance, of compensating for deficiencies in fabrication and specific resin bed conditions, by adjusting flow rates accordingly. Also, it makes possible the use of a single design for both anion and cation units, with adaptation to the particular application being merely a matter of adjustment.

It should be understood that gaskets are provided where required, even though the same are not explicitly indicated in the drawings or discussed herein.

The hub may be either cast and then drilled and tapped or made from appropriately formed sheet stock. A stainless steel alloy is preferable for all of the elements of spider distributor, except where the contrary has been indicated, such as the diaphragm. The wire wrapping or screening on the lateral conduits of the distributor should be made of a similarly corrosion-resistant material.

The invention may now be understood by making reference to FIGS. 1 and 2 in the accompanying textual description of a complete operating cycle.

The first step is that of servicing or treating the influent water to remove impurities. In this step, exchange vessel 10 is filled with its complete complement of resin;

as explained above, resin bed volume can substantially fill the interior of the vessel, provided sufficient rise space is available to allow the resin bed to expand as waste materials and ions are accumulated therein. The service step is accomplished with valves AA and E open and all of the other valves closed. Influent service water enters the system at inlet port 12 and thus flows through pipe section 14, valve AA and pipe section 16 into the main conduit 18 of the spider distributor 20. The flow then proceeds outward through one or more sets of lateral conduits 22 which are in communication with the main conduit 18 of the spider distributor. The lateral conduits each comprise a tube containing a central longitudinal bore and a plurality of ports or holes for permitting the exterior of the tube to communicate with the bore. Water flows from the central passage into the bores of the lateral conduits, out through their ports and into the interior of exchange vessel 10. The service flow then encounters and travels through the resin bed, proceeding downward through the exchange vessel and exiting through the nozzle 25 in the bottom thereof, into pipe section 24. Finally, the treated water proceeds through connecting pipe 28 and valve E to a service flow outlet port 26.

When it becomes necessary to rejuvenate the resin bed, the backwashing, regeneration and rinsing activities are commenced. These begin with operational step no. 2, expanding the resin bed to loosen the packed beads of resin. While this step is optional in nature, it is helpful and generally will be rather short in duration, such as about one-half to one minute. For this step (assuming the valves are initially as specified for the prior step), valves AA and E are closed and the following valves are opened: VA, BA, TA, TB and WB. The described valve conditions permit the service water flow to be used to begin to loosen the resin beads preparatory to dropping the level of the bed within the exchange vessel and transferring part of the bed to the resin drop tank. Thus, with the valve conditions as listed, service water continues to enter inlet port 12 and pipe 14, but now flows through valve BA and the connecting pipes 28 and 24 into the bottom of the exchange vessel at nozzle 25. As a result of the pressure thus applied, the bottom of the packed resin bed begins to loosen. With valves AA, WA, G and BB closed, the service flow must exit from the exchange vessel via resin transfer nozzle 29 and valve TA. Since the bed is partially loosened at this time, the stream of water leaving the vessel through the resin transfer nozzle 29 will sweep resin beads along with it, through resin transfer pipe 32 and valve TB, into the open nozzle 34 at the bottom of the RDT 40. This flow empties directly into the interior of the resin drop tank and does not pass through the underdrain screen 42. The service water exits from resin drop tank 40 through RDT hub assembly 44, into pipe 45. It then flows through valve WB and pipe 47 to waste water outlet port 46.

Having thus prepared the resin bed, the third operational step may be performed: transferring a portion of the resin to the RDT, to drop the level of the resin bed in the exchange vessel. To carry out this step, valve BA is closed and valve AA is opened. As a result of this change, service water which enters inlet port 12 and pipe 14 now flows through valve AA and pipe 16 into the main conduit 18 of the spider distributor 20. The flow then proceeds outward through one or more sets of lateral conduits 22 and into the interior of the exchange vessel 10. As the service flow exits from the exchange vessel through valve TA, it carries with it resin beads which have been loosened from the bed in the previous step. The service flow including such resin beads then proceeds through valve TB and directly into the bottom of the RDT through open nozzle 34, avoiding underdrain screen 42. The service flow leaves the RDT through drop tank hub 44, pipe 45 and valve WB into pipe 47 which terminates at the waste water outlet port 46.

It should be noted that the resin which is transferred to the RDT is inherently backwashed, to a limited extent, in the course of the transfer process.

When the desired amount of resin has been transferred to the RDT, permitting the level of the resin bed in the exchange vessel to drop the intended distance, the resin transfer step is terminated and a backflushing operation, step no. 4, is performed to clean the resin transfer pipe 32 and associated valves of resin. This is accomplished by closing valves VA, AA, TB and WB and opening valves AB, RB and WA. With this system configuration, service water which enters inlet port 12 will flow through pipe 15, valve AB and the drop tank hub assembly 44 into the RDT. To exit from the RDT, the service flow will pass through the portion of the resin bed which has been previously transferred into the RDT, through the underdrain screen 42, and out of the RDT via nozzle 35. From that nozzle, the water proceeds through valve RB, resin transfer pipe 32, valve TA and resin transfer nozzle 29, into the exchange vessel.

Reiterating and restating briefly the explanation given above, when the solenoid valve 76 is in the second state, the main conduit 18 of the spider distributor will be in fluid communication with both the first (i.e., upper) and second (i.e., lower) sets of lateral conduits 88 and 92. However, when the solenoid valve is in the first state, diaphragm 94 will close off the lower set of lateral conduits (92) from main conduit 18, provided that a sufficient pressure is presented via conduit P.

For the first three operating steps discussed above, the solenoid valve is preferably in the second state. The solenoid valve is switched to the first state for the fourth operating step. Thus, the service flow which enters the bottom of the exchange vessel through valve TA will exit through only the upper set of lateral conduits 88 of the spider assembly, into central passage 18, pipe section 16, and valve WA, finally leaving the system via pipe 47 and waste water outlet port 46.

The next (and fifth) operating step to be undertaken is that of backwashing the RDT. This is accomplished by closing valves AB, TA and WA, and opening valves BA, BB, WB and VB. The solenoid valve may be in either state. Service water which enters port 12 flows through pipe 14, valves BA and BB, resin transfer pipe 32, and valve RB into the bottom of the RDT, below the underdrain screen 42. The service flow, since it is under pressure, then proceeds upward through the RDT, backwashing the portion of the resin bed which has been transferred into the RDT. Finally, it exits via drop tank hub 44, pipe 45 to valve WB, then through that valve and pipe 47 to waste water outlet port 46.

After the resin drop tank has been backwashed, the next (i.e., sixth) step is to backwash the resin in the exchange vessel. This is achieved by closing valves BB, RB, WB and VB, and opening valve WA. The solenoid valve should be in the second state. With this arrangement, service water enters port 12 and flows through pipe 14, valve BA, pipes 28 and 24 and then into the nozzle 25 at the bottom of the exchange vessel. The service flow next passes through the underdrain strainer 25A in the bottom of the exchange vessel and backwashes the portion of the resin bed which has remained therein. Egress for the service flow is provided by the spider distributor 20. Since it is intended in the backwashing operation to remove foreign matter from the resin bed, it is necessary that such foreign matter be able to enter the lateral conduits of the spider distributor, to be washed out of the exchange vessel. Thus, the holes in the unscreened (i.e., lower) set of lateral conduits 92 should be sufficiently large to permit such waste matter to enter the conduits with the height of the resin bed in the expanded state kept sufficiently below the position of the spider distributor to prevent carryover and loss of resin. From the spider distributor, the flow is outward from main conduit 18, through pipe 16 and valve WA, to pipe 47 and waste water outlet port 46.

Upon the conclusion of the backwashing operation, the resin which was previously transferred to the RDT must be returned to the exchange vessel. This involves a two step technique. First, it is desirable though optional to raise the portion of the bed which has remained in the exchange vessel, to prepare the exchange vessel to receive the resin from the RDT, step no. 7. Next, the resin from the RDT is fed back into the bottom of the exchange vessel, below the lifted portion of the bed, step no. 8. To accomplish step no. 7, valves AB, TA, TB, and WA are opened. The solenoid valve may be in either state. The service flow which enters through port 12 will be split into two components. A first component of the service flow will pass through pipe 14, valve BA, pipes 28 and 24, and nozzle 25, into the bottom of the exchange vessel. This will create an upward flow in the exchange vessel, pushing upward on and raising the portion of the bed which had remained therein. Simultaneously, the other component of the service flow enters the RDT through pipe 15, valve AB, pipe 45 and drop tank hub 44. Since valve TB is open, the service water will flow through the RDT to carry the resin which had previously been transferred into the RDT out the open nozzle 34 in the bottom thereof (bypassing the underdrain screen 42) and back into the exchange vessel via valve TB, resin transfer pipe 32, valve TA and resin transfer nozzle 29. The two components of the service flow will be recombined within the exchange vessel and will depart therefrom via the spider distributor, finally leaving the system through pipe 16, valve WA, pipe 47 and waste water outlet 46. The solenoid valve is preferably in the first state for this step, so that the flow out of the exchange vessel is through the screened set of lateral conduits only, to prevent an undesirable loss of resin.

Once the bed is raised, valve BA is closed and valve RA is opened (step no. 8) so that the entire service flow can be directed through the RDT, to remove all of the resin therefrom and replace it in the exchange vessel. If the solenoid valve was not placed in the first state in the immediately preceding step, that must be done in this step, since it is likely that resin beads will otherwise be lost from the exchange vessel and dumped with the waste water.

After the resin has been replaced in the exchange vessel, it is desirable to perform a combined flush (step no. 9) of the RDT and appropriate portions of the piping. For this purpose, valves BA, BB and RB are opened, and valves TB and RA are closed. This again splits the service water inlet flow into two components. The first component of the service water flow is directed via pipe 14 and valve BA into pipe 28; at the juncture of pipes 28 and 24 and valve BB, this flow component is further split into two streams. One stream enters the exchange vessel through pipe section 24 and nozzle 25 in the very bottom of the exchange vessel. The other stream is directed through valve BB and enters the exchange vessel through valve TA and resin transfer nozzle 29. The second component of the service flow simultaneously enters the RDT through pipe 15, valve AB, pipe 45 and drop tank hub 44. It then flows downward through the RDT and the underdrain screen or strainer 42, out the RDT via nozzle 35 and valve RB, and into the exchange vessel via resin transfer pipe 32, valve TA and resin transfer nozzle 29. As explained immediately above, the service water departs from the exchange vessel through the spider distributor and is then released from the system through pipe 16, valve WA, pipe 47 and waste water outlet port 46.

The backwashing operation is now complete and the resin is prepared for regeneration. The next step (no. 10) is the introduction of regenerant solution. This is accomplished by closing valves AB, BA, BB, RB, TA, and WA and opening valves RA and G. The solenoid valve is in the first state. With this configuration, the regenerant supplied to regenerant introduction port 13 flows therefrom through valve G, pipe 16 and spider distributor 20 into the exchange vessel. The regeneration solution travels down through the resin bed, freeing trapped ions from the resin and carries them out of the vessel through the nozzle 25 in the bottom thereof. The spent regenerant solution is then discharged through pipes 24 and 28, valve RA, pipe 47 and waste water outlet port 46.

Once the regenerant has been introduced, it is necessary, as the next (i.e., eleventh) step, that it be displaced throughout the resin bed, to provide the desired contact time at the intended solution strength. This is achieved by terminating the introduction of regenerant at port 13 while continuing to introduce water at that point. Usually there is a mixing valve (not shown) for controlling the dilution of the regenerant prior to its introduction at port 13. Thus, this step is normally accomplished by merely closing the mixing valve as to the regenerant, while continuing to run water in. None of the other valve states described above is changed in going from the tenth to the eleventh steps.

Finally, valve G is closed and valve AA is opened (step no. 12) to rinse the regenerant solution out of the exchange vessel and prepare the resin bed for being returned to service. The rinse is accomplished by simply permitting the service water supplied at port 12 to flow through pipe 12, valve AA, pipe 16 and the spider distributor, into the exchange vessel, then through the resin bed and out nozzle 25, pipes 24 and 28, valve RA, and pipe 47, to be dumped at waste water outlet 46. A conductivity probe 120 monitors the conductivity of the fluid flowing out of the exchange vessel. As the regenerant is displaced from the resin bed by the rinse water, the conductivity of the water in pipe 24 (or 28) will decrease. The conductivity measurement obtained via probe 120 is monitored by an automatic control systen (not shown). The control system terminates the rinsing operation and restores the system to service when an acceptably low level of conductivity is detected.

It is to be noted that the RDT is completely disconnected from the exchange vessel during the in-service and regeneration operations, since valves AB, WB, RB and TB are closed, and the RDT is entirely empty of resin. Thus, a single RDT may be associated with multiple exchange vessels, by an appropriate staggering of the operating sequences of the exchange vessels and a multiplexing (i.e., time-sharing) of the single RDT between them.

From the foregoing description, it will be apparent that the system therein set forth has as a further advantageous property the need for only a single connection to the exchange vessel distributor, for connecting to a single distributor, to accomplish operations previously requiring multiple distributors, each of which required a separate access connection. Moreover, the single connection can be made through a single centrally located tank pad, rather than through at least one connection on the side of the vessel, as was customary in the prior art. In other words, both service flow and regenerant can be introduced to the exchange vessel via a single connection thereto and a single hub lateral assembly.

Figure 5:
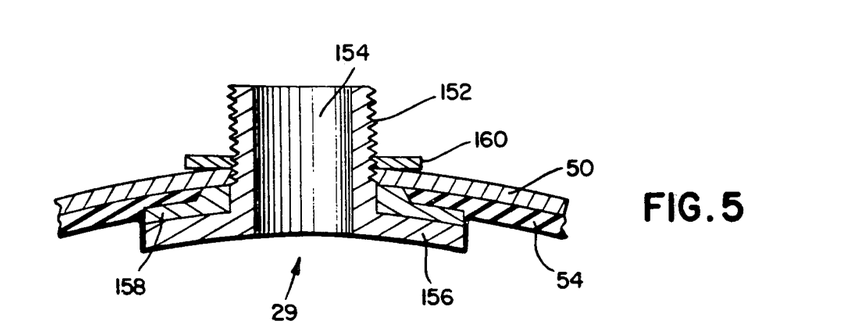
FIG. 5 is a side sectional view of a resin transfer nozzle according to the present invention.

Further referring back to the above text, it was stated that resin transfer nozzle 29 must be of a design which does not destroy the integrity of the interior lining of the exchange vessel. A special design for a suitable nozzle is shown in FIG. 5. The nozzle there illustrated comprises a hollow, threaded sleeve 152 having a central longitudinal bore 154 and a shoulder 156 of greater diameter than the threaded sleeve portion. To install the nozzle in an exchange vessel of a prior art design (for the purpose of upgrading or retro-fitting the associated system according to the present invention), a simple process is employed. First, from the inside of the vessel, a small portion of the vessel lining 54 is cut out to define an opening therein. A hole is next cut or drilled through the vessel wall 50 within the open region of the lining. This hole should be just large enough to receive the threaded sleeve portion of the nozzle, and the open region of the lining should be just slightly larger than the hole in the vessel wall. A molded gasket 158 is then placed against the vessel lining, overlapping the region cut away therefrom and extending inwardly up to the hole in the vessel wall. This gasket should be of a material which is inert to the regenerant solutions and is slightly compressible and flexible, such as a molded rubber. The shape of the gasket should optionally conform to the shape of the nozzle and the curvature of the vessel wall and have a central hole for receiving the threaded sleeve of the nozzle. Preferably, the cut edges of the lining would be tapered, to enhance sealing against the gasket. To further assist in sealing, a cement may be used between the vessel wall and the gasket. The nozzle is then inserted from the inside of the vessel wall. A threaded lock nut 160 is turned down tight over the threaded sleeve of the nozzle, against the outside of the vessel, so that shoulder 156 is brought into close sealing contact with gasket 158 which is, in turn, brought into sealing contact with the portion of the vessel wall 50 which was exposed when the lining material 54 was cut away.

While the surface of nozzle shoulder 156 which is brought into contact with gasket 158 should be shaped to conform the curvature of the vessel wall, as indicated in the drawing, it may be very costly to manufacture a nozzle with a shoulder of such design. In that event, a less costly alternative (not illustrated) may be to form shoulder 156 with a flat surface and to insert a washer between shoulder 156 and gasket 158. The washer would have a flat surface for abutting shoulder 156 and a properly curved surface for contacting the gasket. This washer could be made of a hard plastic or other similar material, while the threaded sleeve element would be easily fabricated from stainless steel. If necessary to prevent leakage, a thin gasket could also be employed between the washer and the shoulder surface.

The resin transfer nozzle can be installed at any desired altitude of the resin bed, depending upon the quantity of resin to be transferred to the RDT. Likewise, a plurality of nozzles could be installed at a plurality of positions, to allow for varying the quantity of resin to be transferred. Moreover, to enhance the hydraulic efficiency of the transfer operation or to permit multiple uses of the resin transfer nozzle, and additional distributor could be connected to the transfer nozzle interior to the vessel and disposed within the resin bed.

Also, it should be understood that valves VA and VB are used in a conventional manner, to vent the drop tank and exchange vessel to the atmosphere. Thus, while such valves are above described as being open only for the specified operating steps, they will normally be monitored by an operator and opened for brief periods of time, at any step in the operation, to vent accumulated air from the vessels, to prevent degradation of resin bed conditions.

From the foregoing description, it should be apparent that the present invention teaches certain additional features and advantages. For example, the resin exchange nozzle may be located at any desired elevation in the exchange vessel to permit removal of a corresponding predetermined portion of the resin bed. Thus, if the frequency of backwashing is increased, the amount of resin which need be removed from the exchange vessel may be decreased and the resin exchange nozzle may be placed higher on the exchange vessel. Also, the diaphragm support wall 100 and the diaphragm port ring 104 comprise a pair of flow control members which together comprise means for proportioning flow between the sets of laterally disposed conduits. Moreover, diaphragm support wall 100, diaphragm stop member 98 and flange 102 on the lower end of the diaphragm support wall are integrally formed so that diaphragm stop member 98 closes one end of the diaphragm support wall and provides a chamber, together with the diaphragm, which chamber may be pressurized by pressure received from a fluid pressure source through the control tube, to accomplish the closing of the diaphragm valve.

Certain conventions regarding the terminology used herein should also be noted. The references herein to a spider distributor relate to the distributor which would be disposed in the upper portion of an ion exchange vessel. In general, there would be distributors in both the upper and lower portions of an ion exchange vessel; however, it has not been necessary for purposes of describing the present invention to discuss a lower distributor member which would be connected, for example, to the lower nozzle 25 at the bottom of the exchange vessel.

In general, typical vessels used in ion exchange demineralizer systems comprise a shell of right, circular, cylindrical configuration, having sloped head sections capping the top and bottom ends of the cylinder. The distributor of the present invention is intended for placement in the top or bottom head of the exchange vessel, preferably as close to the top or bottom head wall, respectively, of the vessel as possible. This is accomplished by empolying laterally disposed conduits having radii which are substantially less than the radius of the shell of the exchange vessel, so that they may be placed in the sloping portion of the top head of the exchange vessel. In the case of a distributor mounted in a vessel's top head, it is contemplated, though not required, that the first, upper set of laterally disposed conduits will thus have a smaller radial extent than the lower, second set of laterally disposed conduits. In effect, this distributor placement, depending upon use (i.e. downflow or upflow), forms either a concentrated hydraulic source or sink, or both, within the confines of the head volume. To further elaborate on the functioning of the distributor, it is noted that the first set of laterally disposed conduits generally serves to distribute a portion of the service flow throughout the upper region of the top head, to achieve complete fluid flow within all portions of the resin bed therein. The second set of laterally disposed conduits distributes the remaining portion of the service flow both in the lower region of the top head and the upper portions of the vessel shell, to achieve fluid flow within all portions of the resin bed therein. Thus, the multiple operation of both sets of laterally disposed conduits creates a completely formed, full flowing hydraulic source or sink to achieve fluid contact with all portions of the resin bed within the vessel head and all portions of the resin bed therebelow. Also, the multiple operation of both sets of laterally disposed conduits provides a greater than normal portion of the service flow directed through the first set of laterally disposed conduits by the predetermined setting of the diaphragm port ring relative to the diaphragm support wall, this portion of the service flow being a greater amount than the design flow (i.e. regenerant flow) used to size the first set of laterally disposed conduits. The pressure drop caused by such setting of the diaphragm port ring serves to supplement the pressure drop inherent in the design of the second set of laterally disposed conduits, to achieve effective control of the backwash flow, such backwash flow being a lesser amount than the higher service water flow.

It is further to be understood that the above-described preferred embodiment is intended to be exemplary only, and not limiting. For example, with minor changes, that same apparatus may be used as a counter-current, upflow regeneration system rather than the downflow service-downflow regeneration example shown. Additional modifications and alterations will readily occur to those familiar with the art. Thus it is intended that the scope of the invention be limited only as defined by the following claims and equivalents thereto.

What is claimed is:

1. A spider distributor for use in an ion exchange vessel, comprising:
   first and second sets of a plurality of laterally disposed conduits;
   each of said laterally disposed conduits having a central, longitudinal bore therethrough and a plurality of passages providing fluid communication between said longitudinally extending bore and apertures on the exterior of said conduits;
   a chamber;
   a main conduit;
   a passage between the chamber and the main conduit;
   remotely actuable valve means for selectively permitting or preventing fluid flow through the passage between the chamber and the main conduit;
   the first set of laterally disposed conduits having their central bores in fluid communication with the main conduit;
   the second set of laterally disposed conduits having their central bores in fluid communication with the chamber.

2. The distributor of claim 1 further including means associated with the first set of laterally disposed conduits to substantially prevent ion exchange resin beads from entering the apertures in said laterally disposed conduits.

3. The distributor of claims 1 or 2 further including means for adjusting the effective aperture size of the passage between the chamber and the main conduit to control the relative fluid flows through the first and second sets of laterally disposed conduits.

4. The distributor of claim 1 wherein the valve means comprises a diaphragm valve operable to selectively open or close the passage between the chamber and the main conduit.

5. The distributor of claim 4 wherein the diaphragm valve further comprises a flexible diaphragm member, a diaphragm support member, a diaphragm stop member and a control tube through which pressure may be applied to the diaphragm member to move the diaphragm member into sealing engagement with the passage between the chamber and the main conduit.

* * * * *